(12) United States Patent
Kim et al.

(10) Patent No.: US 8,322,140 B2
(45) Date of Patent: Dec. 4, 2012

(54) FUEL SYSTEM ACOUSTIC FEATURE TO MITIGATE COMBUSTION DYNAMICS FOR MULTI-NOZZLE DRY LOW NOX COMBUSTION SYSTEM AND METHOD

(75) Inventors: Kwanwoo Kim, Greer, SC (US); Fei Han, Clifton, NY (US); Shiva Srinivasan, Greer, SC (US); Kapil Kumar Singh, Rexford, NY (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 12/651,600

(22) Filed: Jan. 4, 2010

(65) Prior Publication Data
US 2011/0162370 A1    Jul. 7, 2011

(51) Int. Cl.
*F02C 1/00* (2006.01)
(52) U.S. Cl. ............................................. 60/734; 60/725
(58) Field of Classification Search ................. 60/39.37, 60/725, 734, 737–740, 742, 746–748
See application file for complete search history.

(56) References Cited

U.S. PATENT DOCUMENTS

| | | | |
|---|---|---|---|
| 6,305,927 B1 | 10/2001 | Keller | |
| 6,615,587 B1 * | 9/2003 | Schulze | 60/737 |
| 6,820,431 B2 * | 11/2004 | McManus et al. | 60/776 |
| 7,464,552 B2 | 12/2008 | Sattinger | |
| 7,827,797 B2 * | 11/2010 | Han et al. | 60/746 |
| 8,087,228 B2 * | 1/2012 | McMahan et al. | 60/39.37 |
| 2004/0060295 A1 * | 4/2004 | Mandai et al. | 60/725 |

\* cited by examiner

*Primary Examiner* — Phutthiwat Wongwian
(74) *Attorney, Agent, or Firm* — Cantor Colburn LLP

(57) ABSTRACT

A dry low NOx (DLN) fuel nozzle of a fuel system is provided and includes one or more downstream orifices formed to define a first fluid path along which fluid is directed to flow, an upstream orifice, located upstream from the one or more downstream orifices, formed to define a second fluid path along which the fluid is directed to flow and connecting passages disposed to fluidly couple the first and second fluid paths of the downstream and upstream orifices, respectively, to one another. At least one of a radial size and an axial location of the upstream orifice is set to cooperatively detune an acoustic impedance of the fuel system.

15 Claims, 3 Drawing Sheets

FUEL SYSTEM ACOUSTIC FEATURE TO MITIGATE COMBUSTION DYNAMICS FOR MULTI-NOZZLE DRY LOW NOX COMBUSTION SYSTEM AND METHOD

BACKGROUND OF THE INVENTION

The subject matter disclosed herein relates to a fuel system to mitigate combustion dynamics for a multi-nozzle dry low NOx (DLN) combustion system.

In a gas turbine engine, fuel and air are mixed together and combusted within a combustion zone of a combustor. The energy of this combustion is then transformed into mechanical energy in a turbine where it can be used for the production of, e.g., electricity. By-products of the combustion are exhausted. Recently, concerns have grown about the environmental impact of these by-products, however, and efforts have been undertaken to build dry low NOx (DLN) combustors which are designed to decrease the amount of undesired NOx emissions produced as by-products of the combustion.

For DLN gas turbine combustor operation, combustion dynamics has been seen as a concern that may prevent operability, shorten part life and reduce overall durability of associated DLN systems. One main cause for combustion dynamics is when fuel/air ratio fluctuations occur due to pressure fluctuations in the mixing section and corresponding fuel flow rate and air flow rate fluctuations. The fuel/air ratio fluctuations may result in heat release fluctuation and sustained combustion dynamics.

BRIEF DESCRIPTION OF THE INVENTION

According to one aspect of the invention, a dry low NOx (DLN) fuel nozzle of the fuel system is provided and includes one or more downstream orifices formed to define a first fluid path along which fluid is directed to flow, an upstream orifice, located upstream from the one or more downstream orifices, formed to define a second fluid path along which the fluid is directed to flow and connecting passages disposed to fluidly couple the first and second fluid paths of the downstream and upstream orifices, respectively, to one another. At least one of a radial size and an axial location of the upstream orifice is set to cooperatively detune an acoustic impedance of the fuel system.

According to another aspect of the invention, a dry low NOx (DLN) fuel multi-nozzle of a fuel system is provided and includes a plurality of downstream orifices formed to define first fluid paths along which fluid is directed to flow and arranged to form downstream orifice sub-groups, a plurality of upstream orifices, located upstream from the downstream orifices and respectively associated with a corresponding one of the downstream orifice sub-groups, each upstream orifice being formed to define a second fluid path along which the fluid is directed to flow and a plurality of connecting passages disposed to fluidly couple the first and second fluid paths of the sub-grouped downstream orifices and the corresponding upstream orifices, respectively, to one another. At least one of a radial size and an axial location of each of the upstream orifices is independently set to cooperatively detune an acoustic impedance of the fuel system.

According to yet another aspect of the invention, a method of assembling a dry low NOx (DLN) fuel multi-nozzle of a fuel system is provided and includes fluidly coupling a plurality of downstream orifices formed to define first fluid paths along which fluid is directed to flow and arranged to form downstream orifice sub-groups with a plurality of upstream orifices, located upstream from the downstream orifices and respectively associated with a corresponding one of the downstream orifice sub-groups, each upstream orifice being formed to define a second fluid path along which the fluid is directed to flow and independently tuning at least one of radial size and an axial location of each of the upstream orifices to cooperatively detune an acoustic impedance of the fuel system.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features without limitation, by way of example with reference to the drawings.

DETAILED DESCRIPTION OF THE INVENTION

In accordance with embodiments of the invention, it is possible to prevent or substantially mitigate fuel/air ratio fluctuation-driven combustion dynamics by acoustically detuning fuel system acoustic response. For a combustor system including multiple nozzles and/or nozzle groups, mismatched fuel system impedance among the groups may be employed to further mitigate combustion dynamics.

Figure 1:
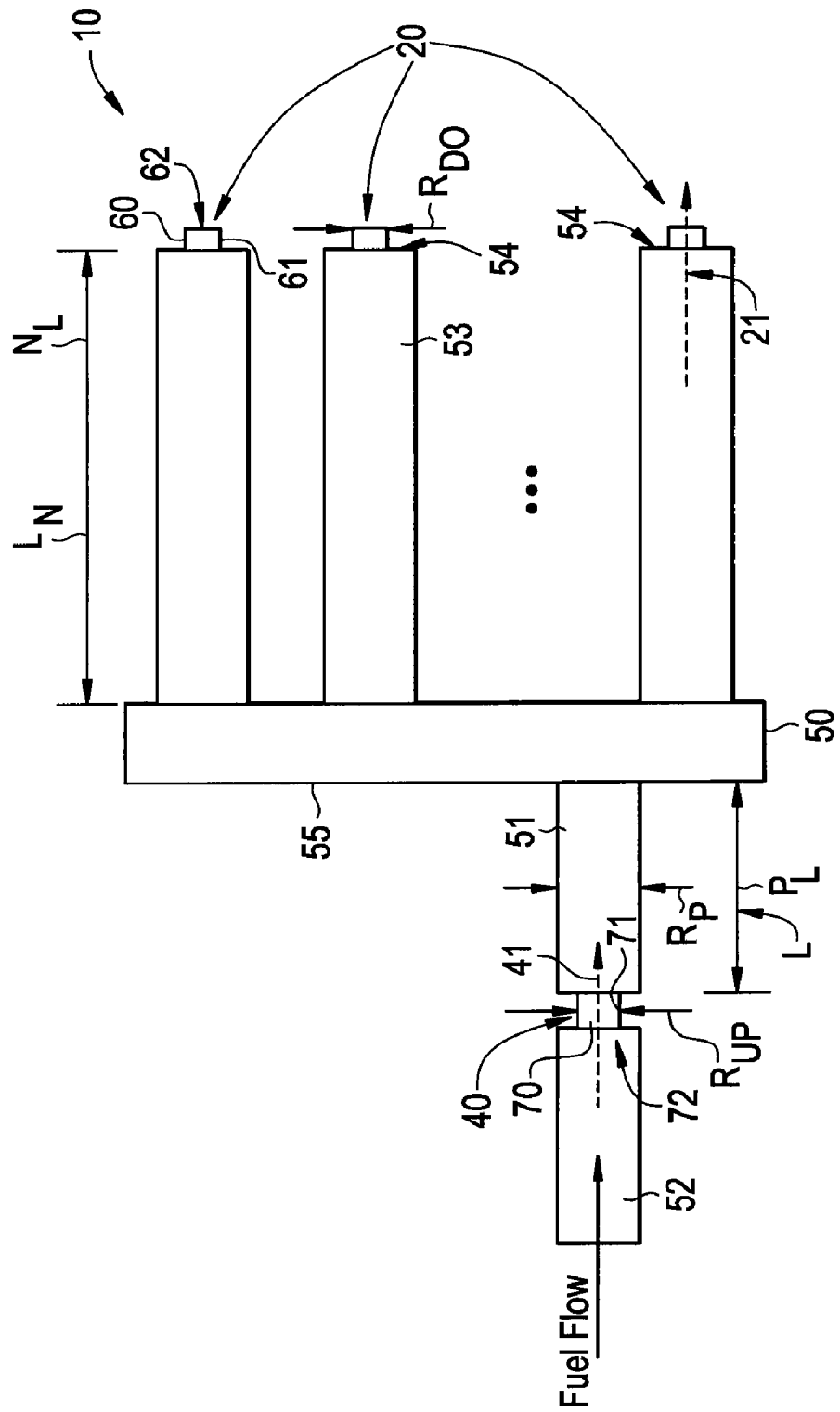
FIG. 1 is a side section view of a schematic illustration of a fuel nozzle group.

As shown in FIG. 1, a dry low NOx (DLN) fuel nozzle 10 of a fuel system (i.e., the fuel flow of FIGS. 1 and 2) is provided and includes one or more downstream orifices 20, an upstream orifice 40 and connecting passages 50. Each of the downstream orifices 20 is formed to define a first fluid path 21 along which fluid, such as fuel flow, is directed to flow toward a mixing section and then a combustion zone of a combustor to which the nozzle 10 is fluidly coupled. The upstream orifice 40 is located upstream from the downstream orifices 20 relative to a flow direction of the fluid path 21 and is formed to define a second fluid path 41 along which the fluid is directed to flow toward the downstream orifices 20. The connecting passages 50 are disposed to fluidly couple the first and second fluid paths 21 and 41 of the downstream and upstream orifices 20, 40, respectively, to one another. With this configuration, at least one of a radial size $R_{UP}$ and an axial location $P_L$ of the upstream orifice 40 may be set at variable values to cooperatively detune an acoustic impedance of the fuel system to thereby prevent or substantially mitigate fuel/air ratio fluctuation-driven combustion dynamics.

Each of the downstream orifices 20 is located at an axial location $N_L$ and has a radial size $R_{DO}$ and may include tubing 60 that opens up to the mixing section of the combustor at a downstream end thereof. The tubing 60 of the downstream orifice 20 includes a sidewall 61 formed to define an aperture 62 extending from an upstream end of the sidewall 61 to the downstream end. While embodiments of the invention include setting the radial size $R_{UP}$ and the axial location $P_L$ of the upstream orifice 40 at variable values, the radial size $R_{DO}$ and the axial location $N_L$ of the downstream orifice 20 are maintained and a number of detuning operations is held relatively low. However, it is understood that, in practice, it may be necessary or desirable to modify the radial size $R_{DO}$ and the axial location $N_L$ of the downstream orifice 20 and, as such, it is understood that embodiments exist in which this is possible.

The upstream orifice 40 is located at the axial location $P_L$ and has the radial size $R_{UP}$, which may be set at variable values, as described above, and may include tubing 70 that opens up to the connecting passages 50. The tubing 70 of the upstream orifice 40 includes a sidewall 71 formed to define an aperture 72 extending from an upstream end of the sidewall 71 to a downstream end thereof.

The connecting passages may include a fuel feed pipe 51 disposed downstream from and fluidly coupled to the upstream orifice 40, an upstream fuel feed pipe 52 disposed upstream from and fluidly coupled to the upstream orifice 40, one or more fuel nozzle parts 53, each of which has a downstream end 54 at which the downstream orifice 20 is disposed, and a common manifold 55. The common manifold 55 is fluidly interposed between the fuel feed pipe 51 and the fuel nozzle part 53.

A length L of the fuel feed pipe 51 is modifiable. In this way, the axial location $P_L$ of the upstream orifice 40, as measured from a plane of the common manifold 55, is tunable. That is, as the length L is shortened, the axial location $P_L$ of the upstream orifice 40 approaches the common manifold 55. Conversely, as the length L is lengthened, the axial location $P_L$, recedes from the common manifold 55. The radial size $R_{UP}$ of the upstream orifice 40 may be equal to or smaller than a radial size $R_P$ of the fuel feed pipe 51. However, it is understood that embodiments exist in which the radial size $R_{UP}$ would be larger than the radial size R.

In accordance with embodiments, the fuel nozzle part 53 may be plural in number. That is, as shown in FIG. 1, the fuel nozzle part 53 may be provided as three (3) separate fuel nozzle parts 53 although it is understood that this is merely exemplary and that embodiments exists with greater or fewer number of fuel nozzle parts 53. In any case, each of the fuel nozzle parts 53 has a substantially similar axial length $L_N$, as measured from the common manifold 55, and is fluidly coupled to the common manifold 55 to thereby receives a common fuel flow. Further, the one or more downstream orifices 20 are correspondingly plural in number with each of the plural downstream orifices 20 being associated with a corresponding fuel nozzle part 53.

Figure 2:
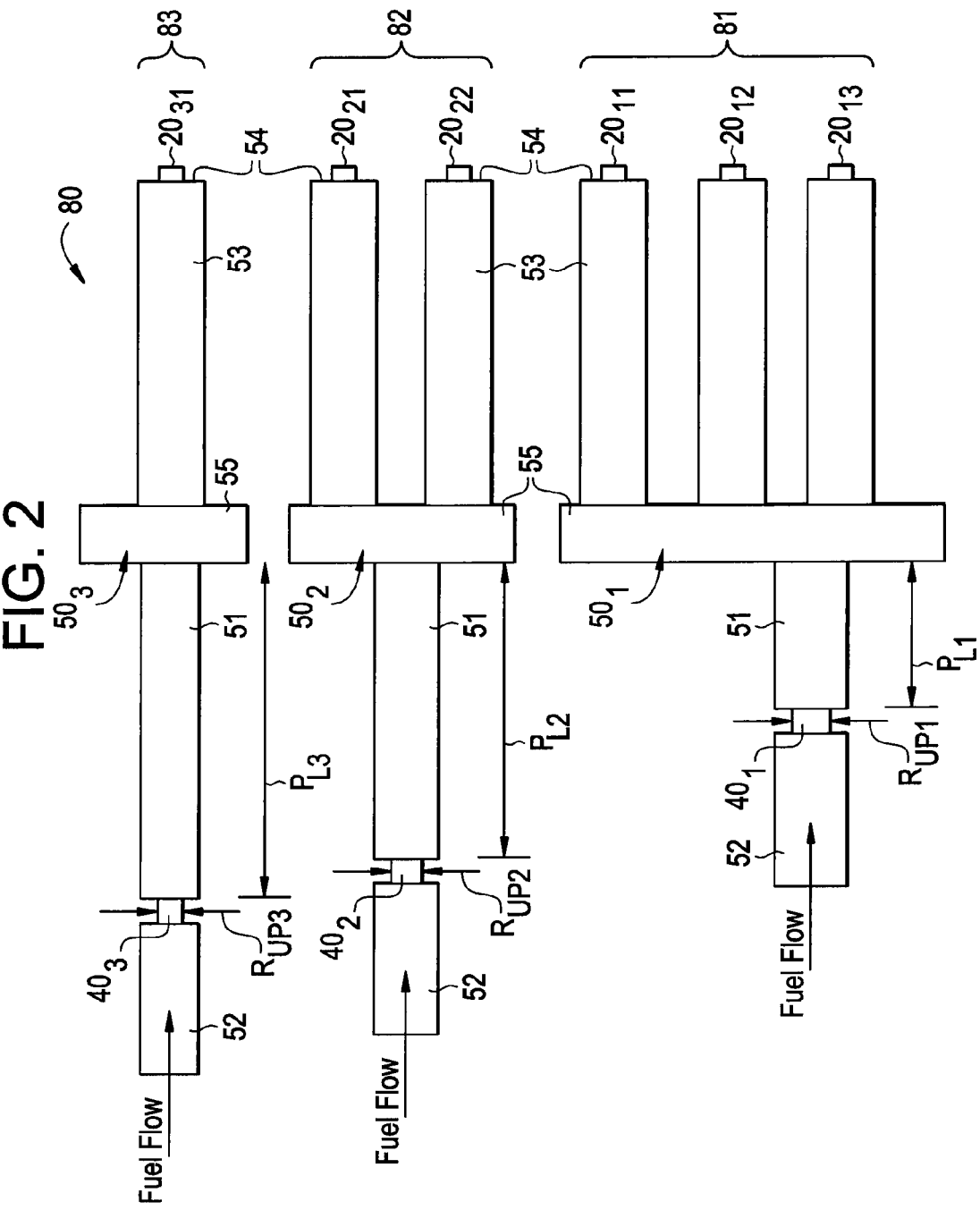
FIG. 2 is a side section view of a schematic illustration of multiple fuel nozzle groups.
Figure 3:
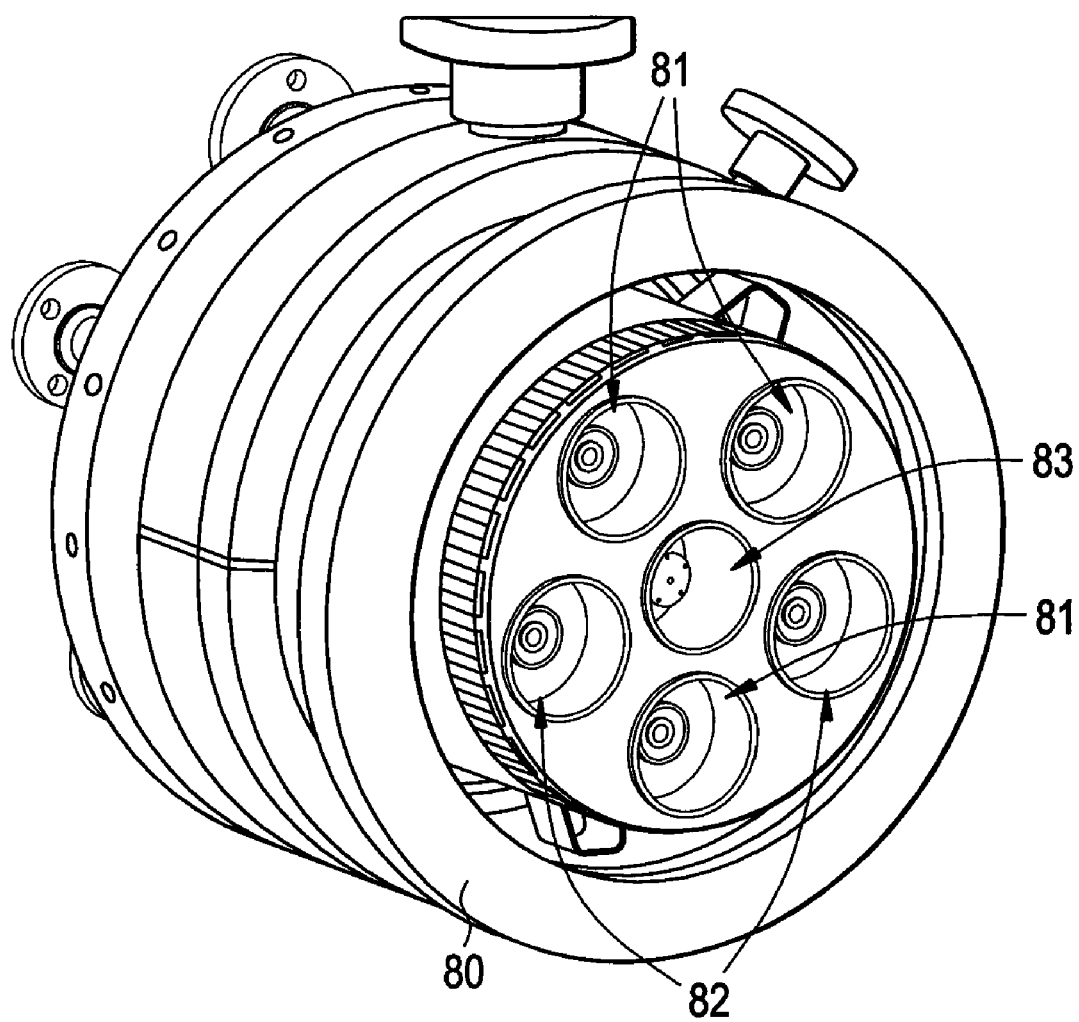
FIG. 3 is a perspective view of a component of a multi-nozzle can combustor.

With reference to FIGS. 2 and 3, a dry low NOx (DLN) fuel multi-nozzle 80 is provided. Many components of the fuel multi-nozzle 80 are similar in structure and operation to corresponding components of the fuel nozzle 10 and detailed descriptions thereof are available hereinabove.

As shown in FIGS. 2 and 3, the fuel multi-nozzle 80 includes a plurality of downstream orifices, such as exemplary downstream orifices $20_{11}$, $20_{12}$, $20_{13}$, $20_{21}$, $20_{22}$, and $20_{31}$ (hereinafter "$20_{ij}$") arranged to form downstream orifice sub-groups 81, 82 and 83, which are arrayed within the fuel multi-nozzle 80 in a predefined pattern that can be set in variable formations. The fuel multi-nozzle 80 further includes a plurality of upstream orifices $40_1$, $40_2$ and $40_3$ (hereinafter "$40_i$") and a plurality of connecting passages $50_1$, $50_2$, and $50_3$ (hereinafter "$50_i$"). Each upstream orifice $40_i$ is located upstream from the downstream orifices $20_{ij}$ and is respectively associated with a corresponding one of the downstream orifice sub-groups 81, 82 or 83 as shown in FIG. 2. The plurality of connecting passages $50_i$ are disposed to fluidly couple the first and second fluid paths of the sub-grouped downstream orifices $20_{ij}$ and the corresponding upstream orifices $40_i$, respectively, to one another. With this configuration, at least one of a radial size $R_{UP1, UP2, UP3}$ and an axial location $P_{L1, L2, L3}$ of each of the upstream orifices 40, may be set at variable values to cooperatively detune an acoustic impedance of the fuel system to thereby prevent or substantially mitigate fuel/air ratio fluctuation-driven combustion dynamics.

In accordance with embodiments, at least one or more of the upstream orifices 40, is located at a unique axial location such that, for example, $P_{L3}>P_{L2}>P_{L1}$. Similarly, at least one or more of the upstream orifices 40, has a unique radial size such that, for example, $R_{UP1}>R_{UP2}>R_{UP3}$.

In the fuel multi-nozzle 80, each of the plurality of the connecting passages 50, may include a fuel feed pipe 51 disposed downstream from and fluidly coupled to each of the upstream orifices $40_i$, a plurality of fuel nozzle parts 53, each having a downstream end 54 at which each of the downstream orifices $20_{ij}$ is disposed and a common manifold 55. In each downstream orifice sub-group 81, 82, 83, the common manifold 55 is fluidly interposed between the fuel feed pipes 51 and the plurality of the fuel nozzle parts 53.

In accordance with another aspect of the invention, a method of assembling a dry low NOx (DLN) fuel multi-nozzle of a fuel system is provided. The method includes fluidly coupling a plurality of downstream orifices formed to define first fluid paths along which fluid is directed to flow and arranged to form downstream orifice sub-groups with a plurality of upstream orifices, located upstream from the downstream orifices and respectively associated with a corresponding one of the downstream orifice sub-groups. Each of the upstream orifices are formed to define a second fluid path along which the fluid is directed to flow. The method further includes independently tuning at least one of radial size and an axial location of each of the upstream orifices to cooperatively detune an acoustic impedance of the fuel system. The independent tuning may include locating at least one or more of the upstream orifices at a unique axial location and/or forming at least one or more of the upstream orifices with a unique radial size.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dry low NOx (DLN) fuel nozzle of a fuel system, comprising:
one or more downstream orifices formed to define a first fluid path along which fluid is directed to flow;
an upstream orifice, located upstream from the one or more downstream orifices, formed to define a second fluid path along which the fluid is directed to flow; and
a connecting passage having a fuel feed pipe, the connecting passage disposed to fluidly couple the first and second fluid paths of the downstream and upstream orifices, respectively, to one another,
at least one of a radial size and an axial location of the upstream orifice having a smaller radial size than a radial size of fuel feed pipe to cooperatively detune an acoustic impedance of the fuel system.

2. The fuel nozzle according to claim 1, wherein each of the downstream orifices comprises tubing that opens up to a mixing section of a combustor at a downstream end thereof and includes a sidewall formed to define an aperture extending from an upstream end thereof to the downstream end.

3. The fuel nozzle according to claim 1, wherein the upstream orifice comprises tubing that includes a sidewall formed to define an aperture extending from an upstream end thereof to a downstream end thereof.

4. The fuel nozzle according to claim 1, wherein the connecting passage further comprises:
 the fuel feed pipe disposed downstream from and fluidly coupled to the upstream orifice;
 a fuel nozzle part having a downstream end at which each of the downstream orifices is disposed; and
 a common manifold fluidly interposed between the fuel feed pipe and the fuel nozzle part.

5. The fuel nozzle according to claim 4, wherein a length of the fuel feed pipe is modifiable such that an axial location of the upstream orifice is tunable.

6. The fuel nozzle according to claim 4, wherein an axial location of the upstream orifice is measured relative to an axial location of the common manifold.

7. The fuel nozzle according to claim 4, wherein the fuel nozzle part is plural in number with each fuel nozzle part being fluidly coupled to the common manifold.

8. The fuel nozzle according to claim 7, wherein each of the downstream orifices for each fuel nozzle part is plural in number with each of the plural downstream orifices being associated with a corresponding fuel nozzle part.

9. The fuel nozzle according to claim 8, wherein each fuel nozzle part has a substantially similar axial length measured from the common manifold, and each downstream orifice has a substantially similar radial size.

10. A dry low NOx (DLN) fuel multi-nozzle of a fuel system, comprising:
 a plurality of downstream orifices formed to define first fluid paths along which fluid is directed to flow and arranged to form downstream orifice sub-groups;
 a plurality of upstream orifices, located upstream from the downstream orifices and respectively associated with a corresponding one of the downstream orifice sub-groups, each upstream orifice being formed to define a second fluid path along which the fluid is directed to flow; and
 a plurality of connecting passages, each connecting passage having a fuel feed pipe and being disposed to fluidly couple corresponding ones of the first and second fluid paths of the sub-grouped downstream orifices and the corresponding upstream orifices, respectively, to one another,
 at least one of a radial size and an axial location of each of the upstream orifices having a smaller radial size than a radial size of the corresponding fuel feed pipe to cooperatively detune an acoustic impedance of the fuel system.

11. The fuel multi-nozzle according to claim 10, wherein at least one or more of the upstream orifices is located at an axial location.

12. The fuel multi-nozzle according to claim 10, wherein each connecting passage of the plurality of the connecting passages further comprises:
 the fuel feed pipe disposed downstream from and fluidly coupled to each of the upstream orifices;
 a plurality of fuel nozzle parts, each having a downstream end at which each of the downstream orifices is disposed; and
 a common manifold fluidly interposed between the fuel feed pipe and the plurality of the fuel nozzle parts.

13. The fuel multi-nozzle according to claim 12, wherein a length of each of the fuel feed pipes is modifiable such that an axial location of the upstream orifice is tunable.

14. The fuel multi-nozzle according to claim 12, wherein an axial location of each of the upstream orifices is measured relative to an axial location of the common manifold.

15. The fuel multi-nozzle according to claim 12, wherein each of the plurality of the fuel nozzle parts has a substantially similar axial length measured from the common manifold, and each of the downstream orifices has a substantially similar radial size.

* * * * *